United States Patent [19]

Uehara et al.

[11] Patent Number: 5,488,384
[45] Date of Patent: Jan. 30, 1996

[54] DISPLAY CONTROL SYSTEM FOR DETERMINING CONNECTION OF OPTIONAL DISPLAY UNIT BY USING PALETTE

[75] Inventors: Keiichi Uehara; Tooru Hanada, both of Tokyo, Japan

[73] Assignee: Kabushiki Kaisha Toshiba, Kawasaki, Japan

[21] Appl. No.: 365,175

[22] Filed: Dec. 28, 1994

Related U.S. Application Data

[63] Continuation of Ser. No. 221,455, Apr. 1, 1994, abandoned, which is a continuation of Ser. No. 904,021, Jun. 25, 1992, abandoned.

[30] Foreign Application Priority Data

Jun. 26, 1991 [JP] Japan .................. 3-154677

[51] Int. Cl.⁶ ...................................... G09G 5/00
[52] U.S. Cl. .................. 345/1; 345/133; 345/186
[58] Field of Search ................. 345/1, 3, 87, 88, 345/150, 153; 348/178, 179, 180, 186, 132, 133

[56] References Cited

U.S. PATENT DOCUMENTS

| | | | |
|---|---|---|---|
| 4,447,889 | 5/1984 | Haneda | 364/927 |
| 4,760,387 | 7/1988 | Ishii | 340/717 |
| 4,980,678 | 12/1990 | Zenda | 340/781 |
| 4,990,904 | 2/1991 | Zenda | 340/797 |
| 5,072,411 | 12/1991 | Yanaki | 395/162 |
| 5,138,305 | 8/1992 | Tomiyasu | 340/717 |
| 5,148,042 | 9/1992 | Nakazoe | 307/65 |
| 5,159,683 | 10/1992 | Lvovsky et al. | 395/500 |

FOREIGN PATENT DOCUMENTS

| | | |
|---|---|---|
| 0395942 | 11/1990 | European Pat. Off. . |
| 0419910 | 4/1991 | European Pat. Off. . |
| 4204994 | 7/1992 | Japan ........... 345/1 |
| 5173524 | 7/1993 | Japan ........... 345/3 |
| 2214766 | 9/1989 | United Kingdom ...... 345/3 |

OTHER PUBLICATIONS

Bt471/476/478, Graphics and Imaging Product Databook 1991, pp. 4-371-4-394.
PEGA 2 Users' Guide, Paradise Systems, Inc., Users' Guide 50208, Rev. 4, pp. 1-60.

*Primary Examiner*—Richard Hjerpe
*Assistant Examiner*—Lun-Yi Lao
*Attorney, Agent, or Firm*—Oblon, Spivak, McClelland, Maier & Neustadt

[57] ABSTRACT

In a computer system having a flat panel as standard equipment and allowing a CRT as an optional unit to be connected thereto, first test data common to R, G, and B in all the palettes in a RAMDAC, and each of the R, G, and B display signal levels output from the RAMDAC is compared with a reference level to determine whether a color CRT is connected. Furthermore, in all the palettes in the RAMDAC, the same data as the first test data is written for G, and data smaller than the first test data is written for R and B, and each of the R, G, and B display signal levels output from the RAMDAC is compared with the reference level to determine whether a monochrome CRT is connected.

6 Claims, 6 Drawing Sheets

DISPLAY CONTROL SYSTEM FOR DETERMINING CONNECTION OF OPTIONAL DISPLAY UNIT BY USING PALETTE

This application is a Continuation of application Ser. No. 08/221,455, filed on Apr. 1, 1994, now abandoned which was a Continuation of application Ser. No. 07/904,021, filed on Jun. 25, 1992, now abandoned.

BACKGROUND OF THE INVENTION

1. Field of the Invention

The present invention relates to a display control system and a method thereof, suitable for a computer system including an LCD (liquid crystal display) or a plasma display as a standard display unit and allowing connection of a CRT display as an optional display unit.

2. Description of Related Art

Conventional portable personal computers such as laptop computers have flat panel displays such as LCD displays and plasma displays as standard display units. These flat panel displays are generally designed to display data by using gray scale levels. Although color LCDs have been developed, they can display only a small number of colors. For this reason, these computers are designed to allow connection of color CRTs (also monochrome CRTs).

Among these computers, there are computers which cannot simultaneously operate a display unit as standard display unit and a display unit connected as an optional display unit. In this case, when the power source is turned on, it is automatically checked whether an optional display unit is connected to the computer. More specifically, when the power source is turned on, an initialization and reliability routine of a basic input/output system (BIOS) is executed to check whether an optional display unit is connected. If the optional display unit is connected, data is displayed on the optional display unit. If the optional display unit is not connected, data is display on the standard display unit.

In a display control system such as a VGA (video Graphic Array) adapter, when it is to be checked whether an optional display unit is connected, specific data for determining the connection of a CRT display is written in a video RAM, the specific data read out from the VRAM is converted into an analog value by a D/A converter, and it is determined, on the basis of loads connected to the R, G and B terminals of the DAC, whether the CRT is connected.

If, however, a resume mode (in which system data indicating the operation conditions of a CPU is saved in response to a power-off signal, and the saved data is restored in response to a power-on signal) is set in a setup process, the operation conditions of the system (the register data, processed data, status data, and the like of the CPU) set immediately before the power-off are saved in a backup memory, and the data saved in the backup memory is restored when the power is supplied again, so that the process interrupted upon power-off is resumed. For this reason, if the power source is turned off and on in the resume mode, the above-mentioned initialization and reliability routine is not executed, and hence it is not determined whether the optional display unit is connected. Therefore, in a case wherein the optional display unit is selected by a setup process while the resume mode is set, if the power source is turned off, and is turned on again after the optional display unit is detached from the computer main body, the resume function works, and an attempt is made to display data on the optional display unit. Consequently, the data is not displayed on either the optional display unit or the standard display unit.

In addition, original data in the VRAM is destroyed by writing the specific data in the VRAM, the original displayed data cannot be reproduced. That is, the resume mode is not achieved.

SUMMARY OF THE INVENTION

It is an object of the present invention to provide a display control system and a method thereof, in a computer system which cannot simultaneously operate a standard display unit and an optional display unit, in which when the system is set up by a resume mode, and the previously used optional display unit is disconnected, display control is switched to the standard display unit to reproduce the previous screen state which was set before a power source was turned off.

According to the first aspect of the present invention, there is provided a display control system in a computer system having a resume function of saving system data indicating operation conditions of a CPU in response to a Non-Maskable Interrupt power-off signal, and restoring the saved data in response to a Non-Maskable Interrupt power-on signal, including a flat panel display as a standard unit, and allowing a CRT display as an optional unit to be connected thereto, comprising means for setting up the standard unit or the optional unit as a display unit to be used, means for determining whether the optional unit is connected, when the computer system is started in a resume mode, and means for driving the standard unit regardless of a setting operation performed by the setting means, when the determining means determines that the optional unit is not connected.

According to the second aspect of the present invention, there is provided a display control system in a computer system having a flat panel display as a standard display unit, and allowing a CRT (Cathode Ray Tube) display as an optional display unit to be connected thereto, comprising a video memory for storing display data, a graphic subsystem for writing and reading display data in and from the video memory, and outputting digital display data to be displayed on the standard display unit or the optional display unit, a digital/analog (D/A) converter, having a plurality of color registers, for converting, the digital display data output from the graphic subsystem, into R (Red), G (Green), and B (Blue) display signal levels, and outputting the display signal levels to a CRT, first determining means for writing first test data in the plurality of color registers, and determining on the basis of the R, G, and B display signal levels output from the D/A converter whether a color CRT is connected, and second determining means for writing second test data in the plurality of color registers, and determining on the basis of R, G, and B display signal levels output from the D/A converter whether a monochrome CRT is connected.

According to the third aspect of the present invention, there is provided a method of determining connection of an optional display unit in a portable computer system having a flat panel display as a standard display unit, allowing a CRT display as an optional display unit to be connected thereto, and including a VGA (Video Graphic Adapter) graphic subsystem, a plurality of color registers, and a digital/analog (D/A) converter for converting digital display data output from the graphic subsystem into R (Red), G (Green), and B (Blue) display signal levels, and outputting the display signal levels to a CRT, comprising the steps of a) writing first test data in the plurality of color registers, and determining on the basis of R, G, and B display signal levels output from the D/A converter whether a color CRT is connected, and b) writing second test data in the plurality of color registers, and determining on the basis of R, G, and B display signal levels output from the D/A converter whether a monochrome CRT is connected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
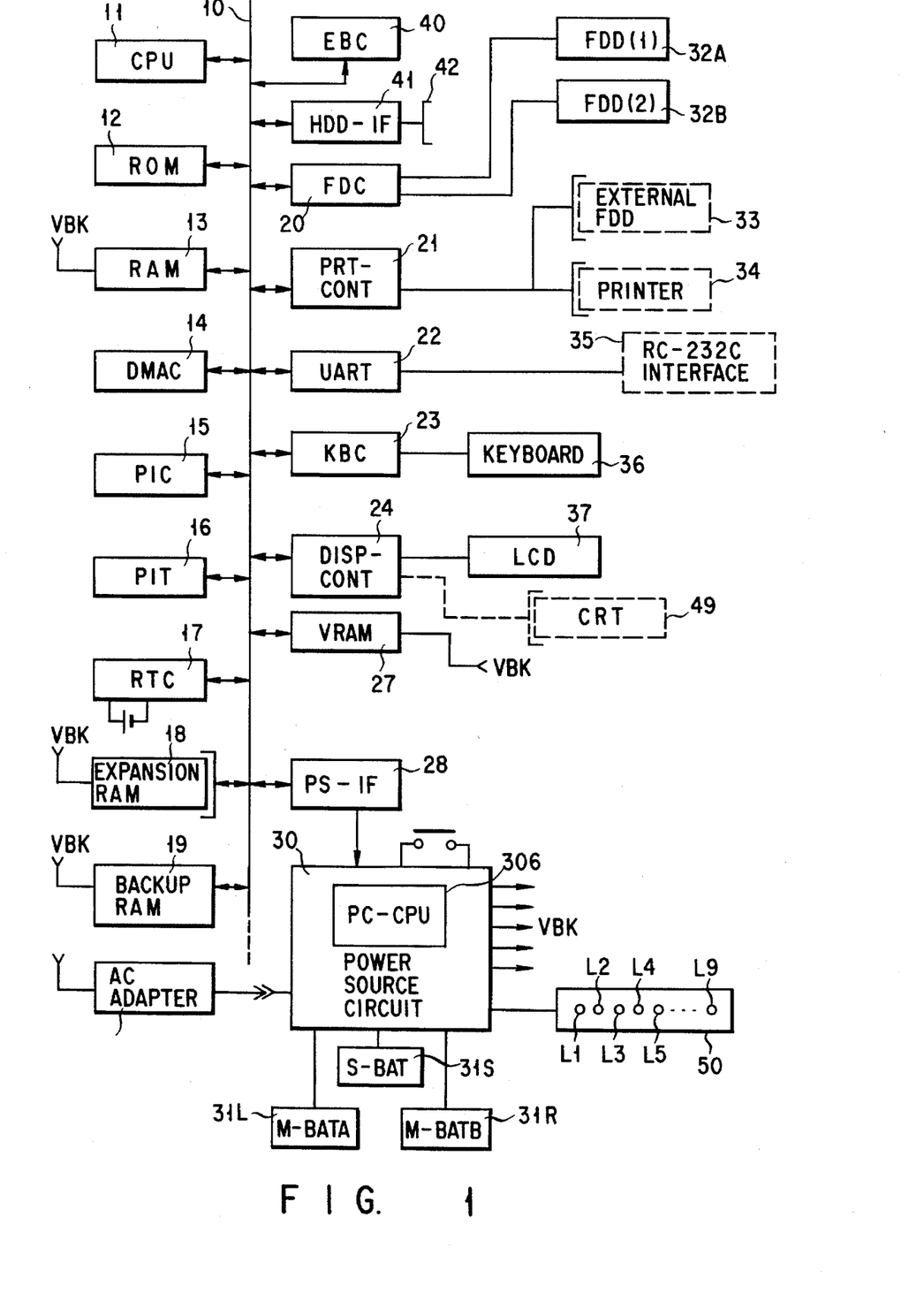
FIG. 1 is a block diagram showing the overall arrangement of a computer system to which a display control system of the present invention is applied.

FIG. 1 is a block diagram showing the overall arrangement of a computer system to which a display control system and a method thereof according to the present invention are applied.

Figure 6:
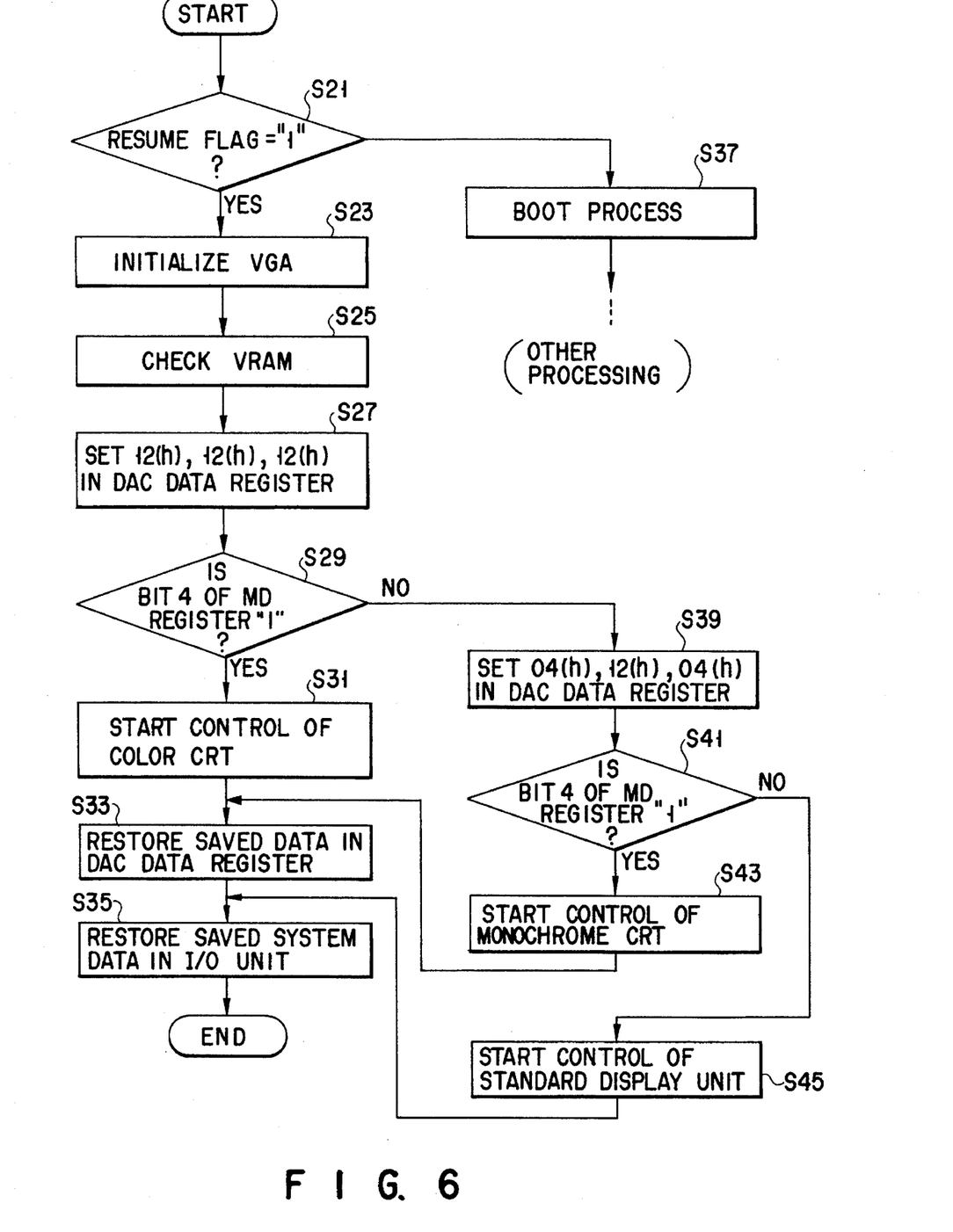
FIG. 6 is a flow chart showing the detailed sequence of a process for automatically determining connection of a display unit shown in FIG. 2.

Referring to FIG. 1, reference numeral 10 denotes a system bus; and 11 through 28, components connected to the system bus 10. Of these components, the component denoted by reference numeral 11 is a CPU (main CPU) for controlling the overall system. In this case, when the power source is turned on, the BIOS-ROM 12 is accessed, and a determination process routine is performed to check whether a CRT display is connected, as shown in FIG. 6.

Reference numeral 12 denotes the BIOS-ROM for storing permanent programs. In this case, the ROM 12 is used to store control programs associated with input/output operations, e.g., the determination process routine shown in FIG. 6 which is designed to check whether the CRT display is connected, and a setup process routine for selecting the use of a standard display unit (FPD) or an optional display unit (CRT display). Reference numeral 13 denotes the RAM constituting a main memory for storing data and the like; 14, the direct memory access controller (DMAC) for performing direct memory access control; 15, the programmable interrupt controller (PIC) which can be set by a program; and 16, the programmable interval timer (PIT) which can be set by a program.

Reference numeral 17 denotes the timepiece module (RTC: Real-time Clock) having its own operating battery and designed to store not only date and time information but also selection information representing whether a charging mode selected through a setup menu (to be described later) is enabled; and 18, the expansion RAM having a large capacity and designed to be detachably inserted in a special card slot in the main body. In this case, four types of memory cards including conventional 1-Mbyte and 2-Mbyte memory cards and new 4-Mbyte and 8-Mbyte memory cards can be arbitrarily inserted.

Reference numeral 19 denotes the backup RAM serving as a data storage area for realizing a resume function. A backup power voltage (VBK) is applied to the backup RAM 19. In the resume mode, the contents of memories and registers, and the like are stored in the backup memory 19 when the power source is turned off.

Reference numeral 20 denotes a floppy disk controller (FDC). Although the controller 20 is designed to control two floppy disk drives 32A and 32B in this embodiment, a 2.5-inch hard disk can be mounted in place of one of the floppy disks (e.g., the FDD 32B) to upgrade the performance of the system.

Reference numeral 21 denotes the printer controller (PRT-CONT) to which an external 5-inch floppy disk drive 33, a printer 34, or the like is selectively connected through a connector.

Reference numeral 22 denotes the input/output interface (USRT: Universal Asynchronous Receiver/Transmitter) to which an RS-232C interface 35 or the like is connected as needed.

Reference numeral 23 denotes the keyboard controller (KBC). In this case, the keyboard controller 23 controls the input operation of a keyboard 36 incorporated in the computer main body in which a CPU board is mounted.

Reference numeral 24 denotes the display controller (DISP-CONT). Although the display controller 24 is used to control only a liquid crystal display (LCD), it can perform display drive control for a CRT display 49 as an optional display unit. Reference numeral 27 denotes the video RAM (VRAM) to which a backup power voltage (VBK) is supplied.

Reference numeral 28 denotes the power source control interface (PS-IF) designed to connect a parallel serial interface (intelligent power supply) 30 to the CPU 11 through the system bus 10. The interface 28 has a serial/parallel conversion function for performing data transmission between the power source circuit 30 and a power control CPU (PC-CPU) 306 by serial interface. Reference numeral 29 denotes a power source adapter (to be referred to as an AC adapter hereinafter) for obtaining DC operating power by rectifying and smoothing commercial AC power. The AC adapter 29 is connected to the portable computer main body with a plug.

Reference numeral 30 denotes the power source circuit (intelligent power supply); 33, a power switch for turning on/off the power source of the portable computer main body; 31L and 31R, pack type main batteries (M-BATA and B-BATA) constituted by rechargeable batteries and designed to be detachably mounted in the computer main body (PC main body). In this case, the power source circuit 30 performs control in the drive mode as follows. One of the batteries is selected as a battery to be used (power supply battery). When the selected battery is used up, a switching operation is performed to select the other battery as a battery to be used. Reference numeral 31S denotes a built-in sub-battery (S-BAT) which is also constituted by a rechargeable battery and designed to apply backup voltage (VBK) to the memories requiring backup, e.g., the RAM 13, the expansion RAM 18, and the video RAM 27.

Reference numeral 40 denotes an expansion bus connector (EBC) for expanding the function of the system. For example, an external hard disk (external HDD) is selectively connected to the connector 40. Alternatively, the connector 40 is selectively connected to an expansion unit including various types of components (e.g., a keyboard, a CRT display, a large-capacity memory, and a personal computer mounting mechanism) for the expansion of the function.

Reference numeral 41 denotes a built-in HDD interface (HDD-IF) for interfacing a built-in HDD (with an HDC) when the system is upgraded to become an HDD-incorporated system (an HDD and an FDD are incorporated each). When the performance of the system is to be improved, the HDD is connected to the built-in HDD interface 41 in place of the floppy disk drive (FDD) 32B.

Reference numeral 50 denotes a state display section constituted by a plurality of state display LED (L1 through L9) driven and controlled by the power control CPU 30b of the power source circuit 30.

Figure 2:
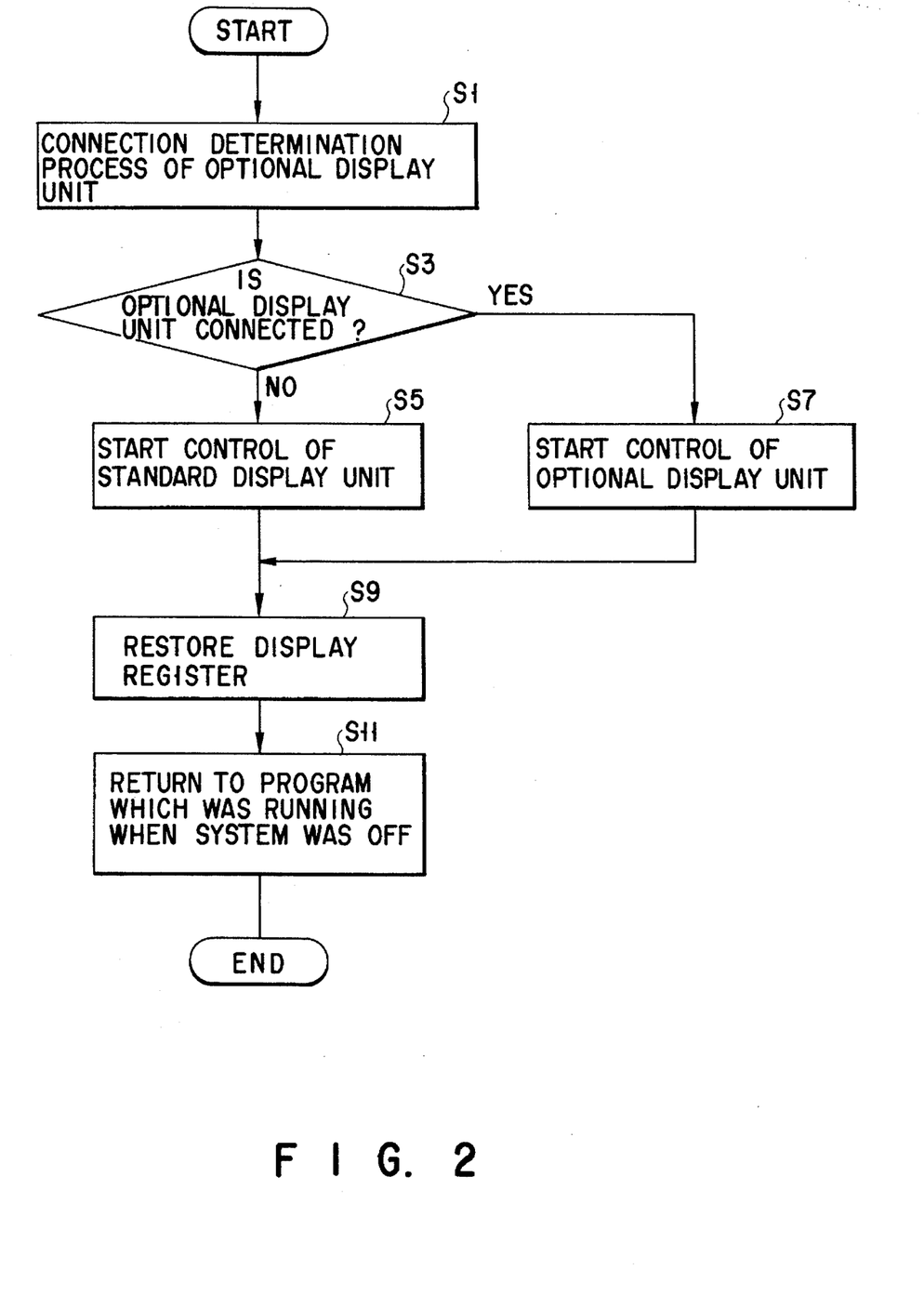
FIG. 2 is a flow chart showing a sequence of a process for automatically determining connection of a display unit in a resume mode start process in the display control system of the present invention.

FIG. 2 is a flow chart for determining whether the optional display unit is connected, and performing a resume process corresponding to the determination result.

More specifically, in step S1, the CPU 11 performs a connection determination process of an optional display unit. In step S3, the CPU 11 checks whether the optional display unit is connected. If it is determined that the optional display unit is connected, the CPU 11 performs start control of the optional display unit (CRT display) 49 in step S7. In contrast to this, if it is determined that the optional display unit is not connected, the CPU 11 performs start control of a standard display unit (LCD) 37 in step S5. In step S9, the CPU 11 restores data, saved in the backup memory 19, in display registers (e.g., color registers 55 in a DAC 53 (to be described later)). Finally, in step S11, the CPU 11 resumes the program at a position where it was interrupted when the system was turned off.

Figure 3:
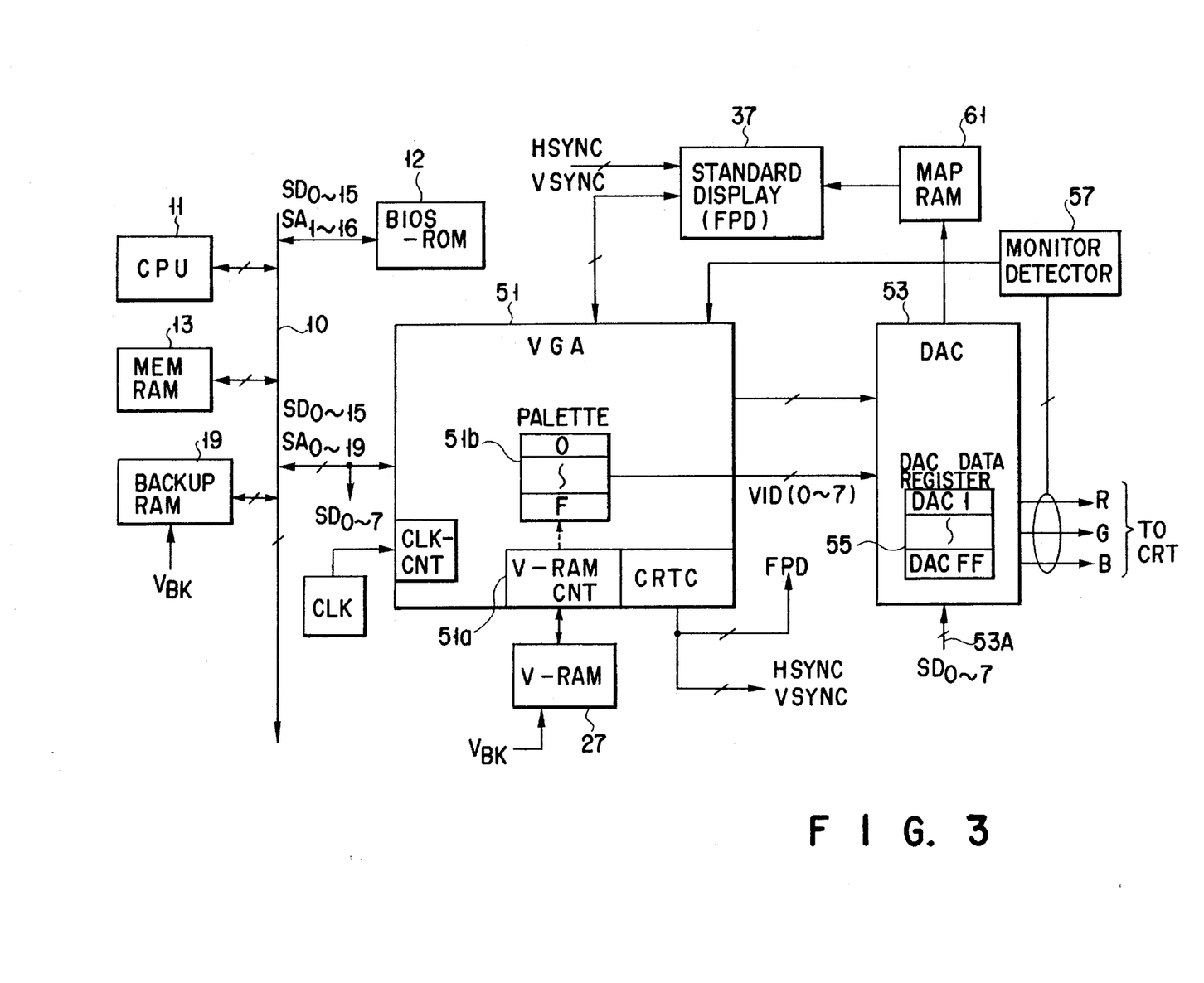
FIG. 3 is a block diagram showing the detailed arrangement of a display controller shown in FIG. 2.
Figure 4:
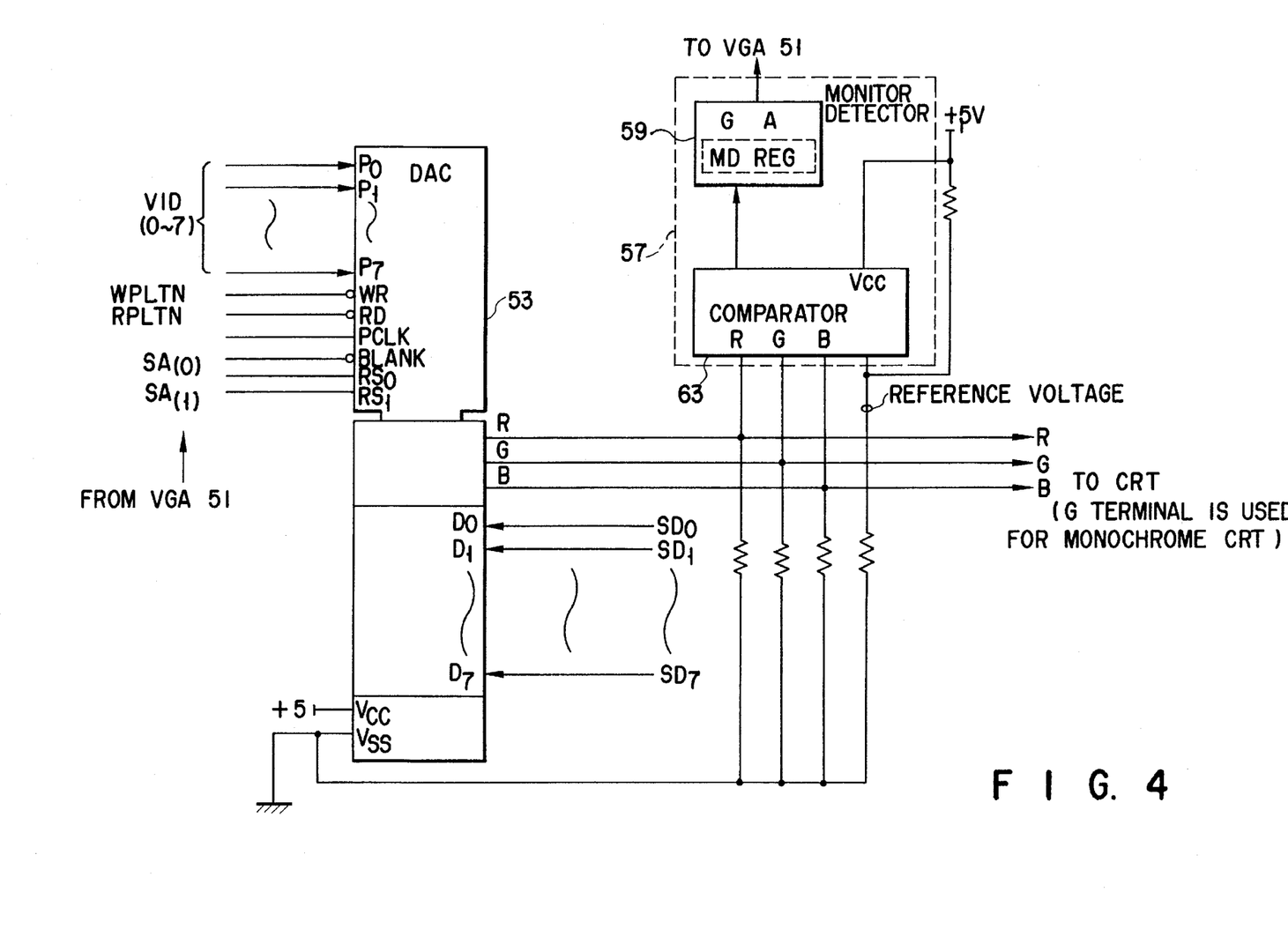
FIG. 4 is a block diagram showing the arrangement of a DAC and a monitor detector.

FIGS. 3 and 4 are block diagrams showing the detailed arrangement of the display controller 24 in FIG. 1. Note that the same reference numerals in FIG. 3 and 4 denote the same parts as in FIG. 1, and a description thereof will be omitted. Referring to FIGS. 3 and 4, a graphic subsystem 51 is a subsystem called, e.g., a VGA (Video Graphic Array) Adapter, which is designed to perform gradation display control for the LCD 37 by accessing the video RAM (VRAM) and perform color CRT or monochrome CRT display control for the optional display unit (CRT display) 49.

The digital/analog converter (RAMDAC) 53 converts display data VID (pixel video data) generated by the graphic subsystem 51 into analog data in accordance with the value of a palette 55, i.e., the internal conversion data registers (also called DAC data registers or color registers) in the RAMDAC 53, thus outputting R, G, and B display signals or multi-gradation display signals. The DAC data registers 55 are constituted by 256 registers (each register consisting of 8 bits). The RAMDAC 53 has a direct data input terminal 53A (SD0–SD7) for setting test data (to be described later) in the internal DAC data registers 55. When it is checked whether the external display unit (CRT display) 49 is connected, test data 12(h) are respectively written in all the R, G, and B DAC data registers 55. In this embodiment, the contents of the VRAM 27 are not updated, unlike the prior art. Therefore, the specific value set in the VRAM 27 cannot be known. For example, in the VGA graphic subsystem, test data is constituted by character data and attribute data. The attribute data assumes 16 values from "0" to "F". These 16 values are used as pointers designating 16 palette registers (denoted by reference numeral 51b in FIG. 3). One of the palette registers is selected by one attribute data. One of the 256 DAC data registers 55 is selected in accordance with the contents (8 bits) of the selected palette register. Therefore, it is not known which one of the 256 DAC data registers 55 is selected. Even if one of the 256 DAC data registers 55 is selected, the same value must be written in all the 256 DAC data registers 55 in order to maintain a constant output voltage at the connector to which the CRT display is connected. By detecting a voltage variation due to connection of the CRT display in such a state, it is properly determined when the CRT display is connected.

The following two connection determination methods will be described below. In one method, test data 12(h) are respectively written in the R, G, and B DAC data registers 55. In the other method, test data 04(h), 12(h), and 04(h) are respectively written in all the R, G, and B DAC data registers 55.

Figure 5:
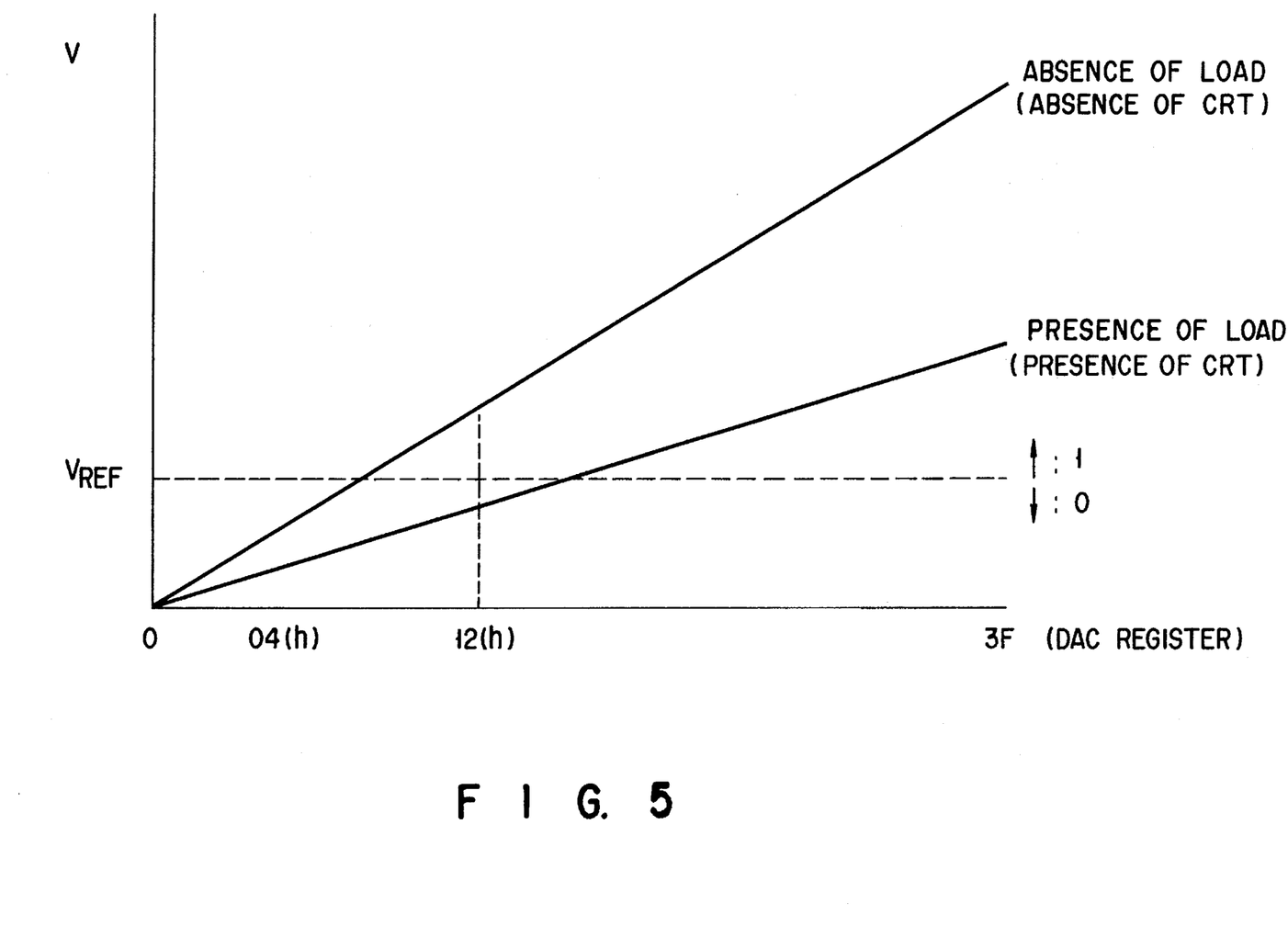
FIG. 5 is a graph showing characteristic curves obtained when a CRT display is connected (the presence of a load) and when the CRT display is not connected (the absence of a load), respectively, in which R, G, and B display signal levels, which vary in accordance with the loads of a CRT connected to R, G, and B terminals of the DAC, are plotted along the ordinate, and test values set in the palettes (color registers) in the DAC are plotted along the abscissa.

FIG. 5 show characteristic curves obtained in the connected) and in the presence of a load (i.e., when the CRT display is connected), respectively. In FIG. 5, R, G, and B display signal levels, which vary in accordance with the loads of the CRT connector R, G, and B terminals of the DAC, are plotted along the ordinate, and the values ("0" through "3F") set in the DAC data registers 55 are plotted along the abscissa. As is apparent from this graph, the value of "12(h)" is selected such that substantially the intermediate value between each of the R, G, and B display signal levels (voltages) in the absence of a load and each of the R, G, and B display signal levels (voltages) in the presence of a load coincides with a reference level. The comparator of a monitor detector 57 outputs "0" when each of R, G, and B display signal levels is lower than the reference level, and outputs "1" when the level is higher than the reference level. The comparator of the monitor detector 57 includes a gate circuit satisfying the following logic expression, and sets a logic calculation result in bit 4 of a status register (MD register):

Bit 4 (MD register) =
$\overline{V(Red) or V(Green) or V(Blue)}$
V(xx) =   0: lower than reference level
          1: higher than reference level

| DAC palette set value | | | | | |
|---|---|---|---|---|---|
| (R: | G: | B) | Bit 4 | Bit 4 | Bit 4 |
| 12H: | 12H: | 12H: | 1 | 0 | 0 |
| 04H: | 12H: | 04H | x | 1 | 0 |
|  |  |  | (color CRT) | (monochrome CRT) | (absence of CRT) |

As is apparent from the above logic expression, when test data 12(h) are respectively written in all the R, G, and B DAC data registers, and all of the R, G, and B signal voltage levels are lower than the reference level, it is determined that the color CRT display is connected. The connection of the monochrome CRT cannot be determined on the basis of test data 12(h) used for the connection determination of the color CRT display.

When test data 04(h), 12(h), and 04(h) are respectively written in all the R, G, and B DAC data registers, and the G signal voltage level is lower than the reference level, it is determined that the monochrome CRT display is connected. The monochrome CRT display is designed to receive only the G signal. Therefore, test data 04(h) are respectively written in the R and B DAC registers so that both the R and B signal voltage levels become lower than the reference level regardless of the absence/presence of a load, while test data 12(h) is written in only the G DAC registers.

When it is to be checked whether a connected CRT monitor is a color CRT monitor or a monochrome CRT monitor, test data 04(h), 12(h), and 04(h) from the data input terminal 53A (SD0–SD7) are respectively written in all the R, G, and B DAC data registers 55. In this case, of the R, G, and B display signal output terminals of the DAC 53, the G (Green) output terminal is used as a display signal output terminal for the monochrome CRT monitor.

The monitor detector 57 checks on the basis of R, G, and B display signal levels or multi-gradation display signal levels output from the DAC 53 whether the external display unit (CRT monitor) 49 is connected and whether an optional display unit is a color CRT monitor or a monochrome CRT monitor. More specifically, the monitor detector 57 compares each display signal level which varies in accordance with the loads of the CRT connected to the R, G, and B terminals of the DAC 53 with the reference level, and determines on the basis of a voltage variations (drops) due to the loads whether the color CRT monitor or the monochrome CRT monitor is connected. The monitor detector 57 includes a register (MD register) 59 in which the determination information is set in bit 4.

The video RAM (VRA) 27 is read-accessed by a VRAM controller (V-RAM CNT) 51a in the VGA 51, and the readout data is output to the DAC 53 through the palette 51b. In this embodiment, even when the power source is in an OFF state, a battery backup voltage (VBK) is applied to retain the data displayed immediately before the power source is turned off.

FIG. 6 is a flow chart showing the process of determining whether a CRT monitor is connected to the system of the embodiment described above. In this embodiment, test data 12(h) are respectively set in all the DAC data registers 55. Each of the R, G, and B signal levels output to the CRT connector at this time is compared with the reference level by a comparator 63 in the monitor detector 57, as shown in FIG. 5. If the logical OR of the comparison results associated with the R, G, and B display signal levels is logic "1", it is determined that the color CRT monitor is connected, and logic "1" is set in the MD register (bit 4) 59. If it is determined that the color CRT monitor is not connected, test data 04(h), 12(h), and 04(h) are respectively set in all the R, G, and B DAC data registers 55. Similarly, each of the R, G, and B display signal levels at this time is compared with the reference level by the comparator 63 in the monitor detector 57. If the logical OR of the comparison results associated with the R, G, and B display signal levels is logic "1", it is determined that the monochrome CRT monitor is connected, and logic "1" is set in the MD register (bit 4) 59. By referring to the contents of the MD register 59, it can be determined whether the CRT monitor 49 is connected, and whether the connected monitor is the color or monochrome monitor.

An operation of an embodiment of the present invention will be described below.

When the power source is turned on in the resume mode, the process of checking whether a CRT is connected to the system is performed in accordance with a system control program in the BIOS stored in the ROM 12 in the interval between the instant at which the power source is turned on and the instant at which a resume process is performed.

More specifically, in a setup process performed after the system power source is turned on, if a resume mode flag is "1" (resume ON), the VGA 51 is initialized, and the video RAM (VRAM) is checked (steps S21 through S25 in FIG. 6). Thereafter, test data 12(h) are respectively set in all the R, G, and B data registers 55 of the DAC 53 (step S27 in FIG. 6).

Each of the R, G, and B display signal levels depending on the loads of the CRT connected to the terminals of the DAC 53 is compared with the reference level shown in FIG. 5, and the comparison result is set in the MD register 59. More specifically, the monitor detector 57 compares the reference level with each of the display signal levels as analog amounts corresponding to the R, G, and B data =12(h), 12(h), and 12(h) (00(h)min –3F(h)max) output from the DAC data register 55 in the DAC 53. If at least one of the three display signal levels is lower than the reference level, logic "1" indicating that the color CRT monitor 49 is connected (the presence of a load) is set in bit 4 of the MD register 59.

If it is determined in step S29 that "1" is set in bit 4 of the MD register, it is determined that the color CRT is connected. The CPU 11 then performs start control of the color CRT in step S31. More specifically, if the same screen as that previously displayed can be displayed, the saved DAC data are restored in the respective registers in the DAC 53, and the screen displayed immediately before the power source is turned off is displayed on the previously used display unit (the standard display unit or the optional display unit). If the previously used CRT monitor is disconnected, the default gradation data for the standard display unit is set in a mapping RAM 61, and the screen display immediately before the power source is turned off is displayed on the standard display unit (steps S33 through S35 in FIG. 6).

In this case, the contents of the video RAM (VRAM) 27 are not rewritten (the stored data are not destructed) in the above-described process of checking the state of the optional display unit 49. Therefore, if the VRAM 27 is backed up by a battery, a display start process can be performed by the resume mode while the previous data are kept stored in the VRAM 27.

If it is determined in step S29 that "1" is not set in bit 4 of the MD register 59, i.e., the color CRT is not connected (the absence of a load), the CPU 11 sets test data 04(h), 12(h), and 04(h) in all the R, G, and B data registers 55 of the DAC 53, respectively, in step S39.

In this case, each of the R, G, and B display signal levels output from the DAC 53 is compared with the reference level by the comparator 63 in the monitor detector 57. As a result, information indicating whether the monochrome CRT monitor is connected is set in the MD register 59. More specifically, the monitor detector 57 compares the reference level with each of the display signal levels as analog amounts corresponding to the R, G, and B data=04(h), 12(h), and 04(h) output from the DAC data registers 55 in the DAC 53. If the G display signal level of the three display signal levels is lower than the reference level, logic "1" indicating that the monochrome CRT is set is set in bit 4 of the MD register 59.

If it is determined in step S41 that bit 4 of the MD register 59 is "1", i.e., the monochrome CRT is connected, the CPU 11 performs start control of the monochrome CRT in step S43. The flow then advances to step S33.

If it is determined in step S41 that the monochrome CRT is not connected, the CPU 11 performs start control of the standard display unit (flat panel display) 37 in step S45. The flow then advances to step S35.

Note that in a test mode, the test data sets (12(h), 12(h), 12(h)/04(h), 12(h), 04(h)) are respectively set in all the R, G, and B DAC data registers 55 in the DAC 53 through the direct input terminal 53A (SD0 through SD7) of the DAC 53.

The data set in the MD register 59 in the above-described manner is output to the VGA 51. Furthermore, the data can be fetched into the CPU 11 through the VGA 51.

In addition to the display data VID (pixel video data), the signals transmitted/received between the VGA 51 and the DAC 53 includes WPLTN (a signal for writing data in the DAC data registers and the color palette), RPLTN (a signal for reading data from the DAC data registers and the color palette), PCLK (a video pixel clock signal used for the DAC 53 to latch the display data VID), BLNK (an active low display monitor blank pulse signal), SA (a latch address signal for selecting one of the DAC data registers), and the like. However, a detailed description of these signals will be omitted.

In addition, in the above-described embodiment, as the optional display unit, CRT monitors are exemplified. However, the present invention can be applied to other types of display units, such as a flat type color display. Furthermore, the mechanism for detecting whether an optional display unit is connected is not limited to the above-described detection mechanism requiring no special hardware. The present invention may employ other types of mechanisms for detecting the connection of an optional display unit, e.g., a mechanism constituted by hardware using a connector terminal and the like, as disclosed in U.S. Ser. No. 578,216.

Moreover, in the above-described embodiment, the status register (MD register) 59 for latching an output from the comparator 63 is arranged in the monitor detector 57. However, the present invention may be designed such that a comparison result from the comparator 63 is directly output to the VGA 51.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A display control system in a computer system having a flat panel display unit as a standard display unit, and allowing a CRT display unit as an optional display unit to be connected thereto, comprising:

a video memory for storing display data;

a graphic subsystem for writing and reading display data in and from said video memory, and for displaying display data on one of the flat panel display unit and the CRT display unit connected to said display control system;

means, having a plurality of color registers, for converting digital R, G, and B signal output from said graphic subsystem into R, G, and B display analog signal levels, and outputting the display analog signal levels as a video signal to the CRT display unit;

means for writing first test data in said plurality of color registers;

means for producing a reference level and comparing the R, G and B display analog signal levels which are output from said plurality of color registers as a video signal, with the produced reference level;

first determining means for determining whether a color CRT is connected in accordance with the result of the comparing means; and means for initializing the color CRT, when the first determining means determines that the color CRT is connected.

2. A system according to claim 1, wherein said first determining means writes test data common to R, G, and B in all said color registers, compares each of the R, G, and B display signal levels with the first reference level, and determines that the color CRT is connected when each of the R, G, and B displaying signal level is lower than the reference level.

3. The system according to claim 1, further comprising:

means for writing second test data in said plurality of color registers;

means for comparing the R, G and B display analog signal levels which are output from said plurality of color registers as video signals, with the produced reference level;

second determining means for determining whether a monochrome CRT is connected in accordance with the result of the comparing means; and means for initializing the monochrome CRT, when the second determining means determines that the monochrome CRT is connected.

4. A system according to claim 3, wherein said computer system has a resume function for saving system data indicating operation conditions of a system in response to a power-off signal, and restoring the saved data in response to a power-on signal, and said first and second determining means determine whether the color CRT or the monochrome CRT is connected, when the resume mode is set.

5. A system according to claim 3, wherein said second determining means writes test data to R and B and test data for G, which is larger than the test data for R and B, in all said color registers, and compares G display signal with a second reference level to determine whether the monochrome CRT is connected.

6. A method of determining connection of an optional display unit in a portable computer system having a flat panel display unit as a standard display unit, allowing a CRT display unit as an optional display unit to be connected thereto, and including a VGA graphics subsystem, a plurality of color registers, and means for converting digital R, G, and B signal output from said graphic subsystem into R, G, and B analog signal levels, and outputting the display analog signal levels to the CRT display unit, comprising the steps of:

a) writing first test data in said plurality of color registers, and producing a reference level to compare the R, G and B display analog signal levels which are output from said plurality of color registers, with the produced reference level;

b) determining whether a color CRT is connected by comparing the R, G, and B display analog signal levels which are output from said plurality of color registers as a video signal set, with the produced reference level; and c) writing second test data in said plurality of color registers, and determining whether a monochrome CRT is connected by substantially comparing the G display analog signal level as a video signal among the R, G, and B display analog signal levels which are output from the plurality of color registers, with the reference level.

* * * * *